Patented Mar. 31, 1953

2,633,466

UNITED STATES PATENT OFFICE 2,633,466

ANHYDRO 2-CARBOXYLICACYLAMINO-3,5-DIIODOBENZOIC ACIDS AND PROCESS

Vernon H. Wallingford, Ferguson, Mo., assignor to Mallinckrodt Chemical Works, St. Louis, Mo., a corporation of Missouri No Drawing. Application December 27, 1948, Serial No. 67,570

15 Claims. (Cl. 260—244)

This invention relates to halogenated compounds and more particularly to derivatives of benzoic acid containing iodine.

Among the objects of this invention are the provision of new compounds which are derivatives of benzoic acid and which contain a plurality of iodine atoms; the provision of compounds of the type indicated which can be purified readily; the provision of compounds of the type referred to which can be used to prepare compounds of related structure; the provision of compounds of the type referred to which can be used to prepare products many of which are characterized by the following properties: substantial water-solubility of their salts; low toxicity to human beings, stability under normal conditions of storage and use, and value as contrast media for X-ray diagnosis; and the provision of methods for preparing compounds of the type referred to. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

The compounds of my invention are new polyiodinated anhydro-2-acylaminobenzoic acids, conforming to the general formula:

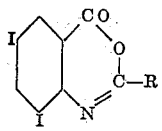

in which R is an aryl or aralkyl radical, a nucleariodine-containing derivative of such a radical, or an alkyl radical.

These new compounds can be prepared conveniently by reacting a 2-acylamino-3,5-diiodobenzoic acid or 2-amino-3,5-diiodobenzoic acid with an acid anhydride or acid chloride. The product crystallizes well and is therefore easily recovered and purified in contrast to the 2-acylamino-3,5-diiodobenzoic acids which crystallize with difficulty and consequently are difficult to recover and purify by conventional methods.

In my copending application, Serial No. 40,000, filed July 21, 1948, I have shown that certain 2-acylamino-3,5-diiodobenzoic acids are valuable new contrast media for X-ray dagnosis. Because they are customarily administered by intravenous injection of a solution of one of their salts, these compounds must be of exceptional purity. The anhydro compounds of the present invention provide a simple and effective method of preparing these exceptionally pure acids and their salts. Thus, to purify a 2-acylamino-3,5-dioodobenzoic acid, it is converted to the corresponding anhydro derivative and the latter is purified by recrystallization. The pure anhydro compound can then be converted back to the free acid if desired. It is not, however, necessary to again isolate the free acid, for the anhydro compound can be dissolved in a solution of some physiologically suitable base, such as, for example, sodium hydroxide, whereby a salt of the acid is formed which is suitable for injection.

From the anhydro compounds of my invention, other valuable compounds can be prepared. For example they may be reacted with certain amino acids to give 2-acylamino-3,5-diiodobenzoyl amino acids, which are useful X-ray contrast media.

The following examples illustrate the invention:

EXAMPLE 1

*2-acetylamino-3,5-diidobenzoic acid*

2-amino-3.5-diiodobenzoic acid (9.7 grams) was mixed with benzol (50 ml.) in a flask provided with a short air condenser, then acetyl chloride (4 ml.) was added and the mixture heated for two hours on a steam bath. There was some evolution of hydrogen chloride, but acetylation was evidently incomplete, so dioxane (35 ml.) was added along with additional acetyl chloride (4 ml.). After one hour on the steam bath all solids were dissolved and in another hour all bubbling had ceased. No solid separated upon cooling. The mixture was poured into water (150 ml.) and sodium carbonate was added until the mixture was alkaline to litmus. By the following day the benzol was entirely evaporated. The sodium carbonate insoluble material (weight 2.1 grams) was separated by filtration and was proved by mixed melting point to be the anhydro form of 2-acetylamino-3,5-diiodobenzoic acid. The sodium carbonate solution was acidified with hydrochloric acid to give 8.1 grams of 2-acetylamino-3,5-diiodobenzoic acid melting at 224–226° C. Acetylation under these conditions gives a yield of about 80% of the regular acetyl compound and 20% of the anhydro form.

EXAMPLE 2

*Anhydro-2-acetylamino-3,5-diiodobenzoic acid*

2-amino-3,5-diiodobenzoic acid (57.8 grams) was mixed with acetic anhydride (260 ml.) containing 3 drops of concentrated sulfuric acid. The mixture was refluxed until all of the solid was in solution and then for an additional 15 minutes. A slight amount of impurities, in the form of a flocculent gray precipitate, did not dissolve. Large crystals of anhydro-2-acetylamino-3,5-diiodobenzoic acid separated on cooling. These were collected on a filter and washed with acetic anhydride, in which they are only very slightly soluble. The flocculent gray precipitate collected in a layer next to the filter paper and could be separated from the product mechanically. Most of the color remained in the mother liquor. The product, when dried, weighed 58.5 grams (95% yield) and melted at 196–197.5° C. The product (19 grams) obtained by recrystallizing 23 grams from acetic acid (250 ml.) did not melt sharply but over a range from 197 to 214° C. Recrystallized again, this time from acetic anhydride, the product (17.6 grams) softened at 196 and melted at 199–201° C. It is probable that recrystallization from acetic acid resulted in partial opening of the ring. Found on analysis: 26.35, 26.06%, carbon; 1.5%, 1.53% hydrogen. Calculated for $C_9H_5O_2NI_2$: 26.2% carbon, 1.2% hydrogen.

EXAMPLE 3

*2-acetylamino-3,5-diiodobenzoic acid*

Anhydro - 2 - acetylamino - 3,5 - diiodobenzoic acid (10 grams) was stirred with dioxane (25 ml.) and water (50 ml.) at room temperature and sodium hydroxide solution (35° Baumé) was added a few drops at a time to keep the mixture definitely red to phenolphthalein. A total of 3 ml. of sodium hydroxide was added over a period of two hours, by which time all of the solid had dissolved. The solution was diluted to 200 ml. with water and made acid to litmus with acetic acid. No precipitate formed, indicating the absence of any unacetylated acid. The mixture was then made acid to Congo red using concentrated hydrochloric acid and the solid was collected on a filter, washed and dried at 105° C. It weighed 9.0 grams and melted at 229.5–230° C. From the mother liquor, 0.9 gram separated as silky crystals, melting at 230–231° C. The melting point of the purified 2-acetylamino-3,5-diiodobenzoic acid varies somewhat with the rate of heating and the temperature at which the specimen is put into the melting point apparatus. This sample was carefully rechecked by placing it in the apparatus at 210° C. and increasing the temperature at the rate of 3° C. per minute. It melted to a red liquid at 228.5–230° C. The equivalent weight was found to be 430 (theory is 430.8). Found on analysis: 25.14, 24.73% carbon; 1.81, 1.79% hydrogen. Calculated for $C_9H_7O_3NI_2$: 25.1% carbon; 1.62% hydrogen.

EXAMPLE 4

*Anhydro-2-butyrylamino-3,5-diiodobenzoic acid*

A mixture of 2-amino-3,5-diiodobenzoic acid (9.7 grams), n-butyric anhydride (25 ml.) and one drop of concentrated sulfuric acid was refluxed in a 200-cc. round-bottom flask. The solid did not dissolve readily, but solution was immediate when dioxane (25 ml.) was added. After refluxing for one-half hour and cooling, an abundant quantity of crystals formed. After standing overnight, the crystals were collected on a filter, washed with two 10-ml. portions of acetic anhydride and dried at 105° C. The anhydro-2-butyrylamino-3,5-diiodobenzoic acid product weighed 7.5 grams (68% of theory) and melted at 153–154° C. The yield could have been improved by hydrolzing the mother liquor, for a considerable amount of solid separated when water was added. Found on analysis: 29.81, 30.28% carbon; 2.01, 2.36% hydrogen. Calculated for $C_{11}H_9O_2NI_2$: 29.94% carbon, 2.06% hydrogen.

EXAMPLE 5

*2-butyrylamino-3,5-diiodobenzoic acid*

A mixture of the anhydro-form of 2-butyrylamino-3,5-diiodobenzoic acid (2 grams), water (50 ml.) and dioxane (50 ml.) was warmed to 60–75° C. on the steam bath. It was stirred and kept alkaline to phenolphthalein paper with sodium hydroxide. The resulting solution was treated with activated carbon, filtered and diluted to about 250 ml. with water. The addition of acetic acid (1:5) produced a white flocculent gelatinous precipitate which was collected on a filter, washed, and dried overnight at 105° C. The purified 2-butyrylamino-3,5-diiodobenzoic acid weighed 1.7 grams (85% of theory) and melted at 203.5–205° C. Analysis showed: 28.87, 28.59% carbon; 2.37, 2.33% hydrogen. Calculated for $C_{11}H_{11}O_3NI_2$: 28.76% carbon; 2.42% hydrogen.

EXAMPLE 6

*2-(n-caproylamino)-3,5-diiodobenzoic acid*

2-amino-3,5-diiodobenzoic acid (9.7 grams) was mixed with dioxane (50 ml.) n-caproyl chloride (8 grams-8.4 ml.) and refluxed for two hours. Evolution of hydrogen chloride ceased after one and one-half hours. The mixture was then poured into water (50 ml.), warmed to 70–80° C. and sodium hydroxide was added to maintain the alkalinity of the mixture to phenolphthalein. All of the solid dissolved within 12 minutes. The solution was diluted with water (150 ml.), treated with activated carbon, filtered and divided between two 3-liter beakers (which were then filled with water. These solutions were heated to 65–70° C. and precipitated first with dilute acetic acid and then with dilute hydrochloric acid to a pH of about 4, filtered while still hot and washed. The 2-(n-caproylamino)-3,5-diiodobenzoic acid product weighed 11.1 grams after having been dried at 70° C. overnight. The melting point was 205.5 to 206.5° C. when the sample was placed in the melting point apparatus at 190° C. and heated at the rate of 4° C. per minute. Analysis showed: 32.3%, 32.59% carbon; 3.19, 3.51% hydrogen. Calculated for $C_{13}H_{15}O_3NI_2$: 32.0% carbon; 3.08% hydrogen.

EXAMPLE 7

*Anhydro-2-(n-caproylamino)-3,5-diiodobenzoic acid*

A mixture of 2-(n-caproylamino)-3,5-diiodobenzoic acid (9 grams) and acetic anhydride (50 ml.) was refluxed for 25 minutes. The solution was slightly yellow initially, but the color did not deepen during this period. After cooling to room temperature, the solution was seeded with anhydro-2-acetylamino-3,5-diiodobenzoic acid. No crystals formed, thus indicating that the caproyl group had not been displaced. The solution was poured into water (200 ml.) and stirred until all of the excess acetic anhydride was hydrolyzed. The solid anhydro-2-(n-caproylamino)-3,5-diiodobenzoic acid which precipitated weighed 8.7 grams (theory 8.69 grams) and melted at 68–70° C. when air-dried. This was recrystallized from alcohol (90 ml.) to yield 4.9 grams melting at 71–71.5° C. Found on analysis: 33.2, 33.29% carbon; 2.80, 2.97% hydrogen. Calculated for $C_{13}H_{13}O_2NI_2$ 33.2% carbon; 2.77% hydrogen.

The anhydro-compound was readily hydrolyzed by digesting 2 grams in dioxane (25 ml.) and water (25 ml.) at 70–80° C. and adding sodium hydroxide solution drop by drop to maintain the pH at 9–11. After 18–20 minutes the mixture was poured into water (200 ml.) and precipitated by very dilute acetic acid at 60° C. The 2-(n-caproylamino) - 3,5 - diiodobenzoic acid product weighed 2.0 grams and melted at 213–214° C. The equivalent weight was found to be 474 compared to the theory of 487. It is probable that slight hydrolysis of the caproyl group occurred during this operation.

EXAMPLE 8

*2-benzoylamino-3,5-diiodobenzoic acid*

A mixture of 2-amino-3,5-diiodobenzoic acid (9.7 grams), dioxane (50 ml.) and benzoyl chloride (6.8 ml.) was placed in a 200 cc. round-bottom flask provided with a reflux condenser. After refluxing for 3½ hours, the reaction mixture was cooled, poured into water (50 ml.), warmed to 70–80° C. and dissolved by adding 35° Baumé sodium hydroxide solution (10 ml.) in small quantities, keeping the solution just alkaline to phenolphthalein. The solution was then diluted with water (150 ml.), treated with activated carbon, filtered and divided between two 3-liter beakers filled with water. After making the solution acid to litmus, it was allowed to stand overnight. On the following morning both beakers were filled with a fluffy gelatinous precipitate. The pH was adjusted to 4 using bromocresol green paper. The precipitate was removed by filtration and a second crop was obtained from the mother liquor after first making it acid to Congo red with dilute hydrochloric acid. After drying overnight, the first crop weighed 8.1 grams and the second crop weighed 3 grams. The total yield of 2-benzoylamino-3,5-diiodobenzoic acid was 90% of theory. The melting point was 196 to 198° C. After recrystallizing from glacial acetic acid twice and treating with activated carbon each time, the melting point was 211.5 to 213° C. Analysis showed: 34.04, 34.13% carbon; 2.03, 2.05% hydrogen. Calculated for $C_{14}H_9O_3NI_2$ 34.08% carbon; 1.8% hydrogen.

EXAMPLE 9

*Anhydro-2-benzoylamino-3,5 - diiodobenzoic acid*

A mixture of 2-benzoylamino-3,5-diiodobenzoic acid (10 grams) and acetic anhydride (50 ml.) was refluxed for 1½ hours, but much solid remained undissolved. Dissolution was aided by two 50 ml. portions of dioxane and refluxing was continued for an additional twenty minutes. On cooling, a large quantity of needle-shaped crystals formed. When crystallization appeared to be complete, the flask was cooled in tap water, whereupon an additional flocculent precipitate was formed. This latter precipitate was dissolved by rewarming the flask and the original needle-shaped crystals were collected on a filter. They were washed in a small quantity of acetic anhydride and dried overnight at 105° C. The first crop weighed 6.7 grams and melted at 228–229° C. The second crop weighed 1.3 grams and melted at 224–225° C. A mixture of the two melted at 227–228° C., indicating them to be the same substance. By mixed melting points the product was proved not to be either 2-acetylamino-3,5-diiodobenzoic acid or 2-amino-3,5-diiodobenzoic acid. Therefore the benzoyl group did not split off. The yield of 8.2 grams of anhydro-2 - benzoylamino - 3,5 - diiodobenzoic acid was 84% of theory. Found on analysis: 35.59, 35.21% carbon; 1.73, 1.69% hydrogen. Calculated for $C_{14}H_7O_2NI_2$: 35.38% carbon; 1.49% hydrogen.

EXAMPLE 10

*2-(o-iodobenzoylamino)-3,5-diiodobenzoic acid*

A mixture of 2-amino-3,5-diiodobenzoic acid (9.7 grams), o-iodobenzoyl chloride (15.8 grams) and dioxane (50 ml.) was refluxed for four hours. The mixture was cooled, poured into water (50 ml.), warmed to 65° C. and dissolved by keeping the solution alkaline to phenolphthalein with sodium hydroxide. About one-half hour was required. The solution was diluted with water (150 ml.) and the pH adjusted to 5 with 1:5 acetic acid. The precipitate was separated by filtration and dried. The 2-(o-iodobenzoylamino)-3,5-diiodobenzoic acid weighed 14.5 grams, 94% of theory, and melted at 222.5 to 224.5° C. with decomposition. Analysis showed: 26.76, 26.80% carbon; 1.76, 1.75% hydrogen. Calculated for $C_{14}H_8O_3NI_3$: 27.15% carbon; 1.30% hydrogen.

The filtrate was adjusted to pH 2 with dilute hydrochloric acid, whereupon another precipitate, white and flocculent, formed. When filtered, washed and dried, this weighed 8.3 grams and melted at 158–161° C. A mixture of this product with o-iodobenzoic acid melted at 160.5–162° C., proving them to be the same substance.

EXAMPLE 11

*Anhydro-2-(o-iodobenzoylamino)-3,5-diiodobenzoic acid*

A mixture of 2-(o-iodobenzoylamino)-3,5-diiodobenzoic acid (5 grams) and acetic anhydride (15 ml.) was refluxed for 1½ hours. During the course of the reaction it became apparent that all of the solid would not dissolve, so 10 ml. and later 3 ml. more of acetic anhydride was added. On cooling, very small crystals separated rapidly. These were collected on a filter, washed with acetic anhydride and dried at 90° C. The anhydro - 2 - (o-iodobenzoylamino)-3,5-diiodobenzoic acid product weighed 4.2 grams (86% of theory) and melted to a clear, light yellow liquid at 171–172° C. Found on analysis: 28.11, 27.76% carbon; 1.20, 1.10% hydrogen. Calculated for $C_{14}H_6O_2NI_3$: 27.96% carbon; 1.01% hydrogen.

EXAMPLE 12

*2-(α-phenylbutyrylamino)-3,5-diiodobenzoic acid*

A mixture of 2-amino-3,5-diiodobenzoic acid (9.7 grams), α-phenylbutyryl chloride (10.7 grams) and dioxane (50 ml.) was refluxed. Hydrogen chloride was evolved within the first two minutes of refluxing. After one hour and forty minutes refluxing, the reaction mixture was cooled, poured into water (50 ml.), warmed to 70–80° C. and dissolved by adding sodium hydroxide in small quantities, keeping the mixture alkaline to phenolphthalein. Solution required about 45 minutes. When the solid was nearly dissolved, an oil separated, but this also dissolved. A total of 8.5 ml. of sodium hydroxide solution (35° Baumé) was required. The solution was diluted with water (150 ml.), treated with activated carbon, filtered, diluted to 1800 ml. and precipitated with dilute hydrochloric acid. The precipitate was gelatinous and very fluffy. It was filtered, washed and dried overnight at 105° C. The 2-(α-phenylbutyrylamino)-3,5-diiodobenzoic acid product weighed 12.1 grams, which was 84% of theory. The melting point was 220° C. Recrystallization from a 50–50 dioxane-water mixture in three portions, using 900 ml. of solvent gave an 87% recovery of a product which melted at 227–227.5° C. when placed in the melting point apparatus at 200° C. Found on analysis: 38.45% carbon; 2.75% hydrogen; 2.86% nitrogen. Calculated for $C_{17}H_{15}O_3NI_2$: 28.13% carbon; 2.83% hydrogen; 2.62% nitrogen.

EXAMPLE 13

*Anhydro - 2-(α-phenylbutyrylamino)-3,5-diiodobenzoic acid*

A mixture of 2-(α-phenylbutyrylamino)-3,5-diiodobenzoic acid (2.7 grams) and acetic anhydride (20 ml.) was refluxed) When it appeared that the solid was not going to dissolve, dioxane (10 ml.) was added and refluxing continued for one-half hour after solution was complete. No crystals formed when the solution was allowed to stand overnight. The solution was therefore placed in an evaporating dish and allowed to evaporate spontaneously. In this manner crystals in the form of needles were deposited in the bottom of the dish, whereas discolored material separated on the sides. The anhydro-2-(α-phenylbutyrylamino)-3,5-diiodobenzoic acid needles weighed 0.8 gram and melted at 113–115.5° C. The disclosed material weighed 1.7 grams. The total yield of 2.5 grams was 96% of theory. Found on analysis: 39.02, 39.42% carbon; 2.43, 2.50% hydrogen. Calculated for $C_{17}H_{13}O_2NI_2$: 39.46% carbon, 2.53% hydrogen.

As indicated above, where the poly-iodo compound contains an aryl group other than the phenyl nucleus of the benzoic acid, additional iodine may be substituted in this nucleus as well.

Many variations of my invention will be apparent to those skilled in the art. For example, although I prefer an excess of the acid anhydride or acid chloride or dioxane as a solvent, other common solvents can be employed providing they are inert to the reactants and reaction product. Likewise, although I usually prefer to add a small amount of sulfuric acid as a catalyst to improve the yield and purity of the product, such addition is by no means essential.

Throughout the claims it will be understood that the term acyl refers to carboxylic acyl radicals.

In view of the above, it will be seen that the several objects of the invention are achieved and other advantages results attained.

As many changes could be made in the above methods and products without departing from the scope of the invention, it is intended that all matter contained in the above description shall be interpreted as illustrative and not in a limiting sense.

I claim:

1. The method of making an anhydro 2-carboxylicacylamino-3,5-diiodobenzoic acid which comprises heating a 2-carboxylicacylamino-3,5-diiodobenzoic acid with the anhydride of a lower aliphatic acid.

2. A compound selected from the group consisting of:

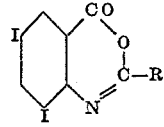

in which R is a radical selected from the group consisting of monocyclic hydrocarbon aryl and monocyclic hydrocarbon aralkyl radicals, nuclear-iodine-containing monocyclic hydrocarbon aryl and monocyclic hydrocarbon aralkyl radicals, and lower alkyl radicals.

3. Anhydro-2-acetylamino-3,5-diiodobenzoic acid, having the structural formula:

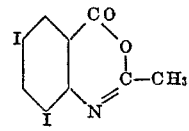

4. Anhydro-2-butyrylamino-3,5-diiodobenzoic acid, having the structural formula:

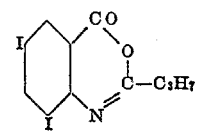

5. Anhydro-2-(n-caproylamino)-3,5-diiodobenzoic acid, having the structural formula:

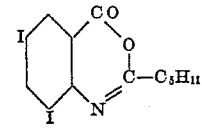

6. Anhydro-2-benzoylamino-3,5-diiodobenzoic acid, having the structural formula:

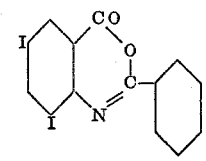

7. Anhydro-2-(o-iodobenzoylamino)-3,5-diiodobenzoic acid, having the structural formula:

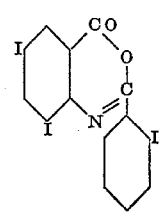

8. The method of making an anhydro-2-carboxylicacylaminobenzoic acid which comprises heating a compound selected from the group consisting of 2-amino-3,5-diiodobenzoic acid and 2-carboxylicacylamino-3,5-diiodobenzoic acids with a compound selected from the group consisting of the anhydrides and chlorides of monocyclic hydrocarbon aromatic acids, mixed aliphatic-monocyclic hydrocarbon aromatic acids, the nuclear-iodine-containing anhydrides and chlorides of monocyclic hydrocarbon aromatic and mixed aliphatic-monocyclic hydrocarbon aromatic acids, and lower aliphatic acids.

9. A compound of the type:

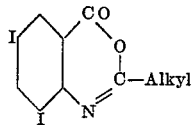

in which alkyl represents a lower alkyl group.

10. A compound of the type:

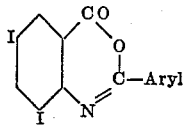

in which the aryl group is monocyclic.

11. The method of making an anhydro-2-carboxylicacylamino-3,5-diiodobenzoic acid which comprises heating a compound selected from the group consisting of 2-amino-3,5-diiodobenzoic acid and 2-carboxylicacylaminobenzoic acids with a chloride of a monocyclic hydrocarbon aromatic acid.

12. The method of making an anhydro-2-carboxylicacylamino-3,5-diiodobenzoic acid which comprises heating a compound selected from the group consisting of 2-amino-3,5-diiodobenzoic acid and 2-carboxylicacylaminobenzoic acids with a chloride of a nuclear-iodine containing derivative of a monocyclic hydrocarbon aromatic acid.

13. The method of making an anhydro-2-carboxylicacylamino-3,5-diiodobenzoic acid which comprises heating a compound selected from the group consisting of 2-amino-3,5-diiodobenzoic acid and 2-carboxylicacylaminobenzoic acids with a chloride of a lower aliphatic acid.

14. The method of making an anhydro-2-carboxylicacylamino-3,5-diiodobenzoic acid which comprises heating a compound selected from the group consisting of 2-amino-3,5-diiodobenzoic acid and 2-carboxylicacylamino-3,5-diiodobenzoic acids with the anhydride of a lower aliphatic acid.

15. The method of making anhydro-2-acetylamino-3,5-diiodobenzoic acid which comprises heating 2-amino-3,5-diiodobenzoic acid with acetic anhydride.

VERNON H. WALLINGFORD.

REFERENCES CITED

The following references are of record in the file of this patent:

UNITED STATES PATENTS

| Number | Name | Date |
|---|---|---|
| 1,951,807 | Preiswerk et al. | Mar. 20, 1934 |
| 2,219,009 | Eckert et al. | Oct. 22, 1940 |
| 2,458,526 | Oberright | Jan. 11, 1949 |
| 2,476,559 | Nawiasky | July 19, 1949 |

OTHER REFERENCES

Villiger: Chem. Abs., vol. 4 (1910), page 181.
Heller: Chem. Abs., vol. 23 (1928), page 828.
Lothrop et al.: Chem. Abs., vol. 37 (1943), page 2364.
Hirwe et al.: Chem. Abs., vol. 37 (1943), page 4061.